(12) United States Patent
Jahan et al.

(10) Patent No.: US 9,444,668 B2
(45) Date of Patent: Sep. 13, 2016

(54) FRAME SYNCHRONIZATION IN A RECEIVER USING A PREAMBLE HAVING A SPECIFIC STRUCTURE

(71) Applicant: Orange, Paris (FR)

(72) Inventors: Bruno Jahan, Tinteniac (FR); Tuan Anh Truong, Plouzane (FR); Hao Lin, Rennes (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/430,128

(22) PCT Filed: Sep. 20, 2013

(86) PCT No.: PCT/FR2013/052197
§ 371 (c)(1),
(2) Date: Mar. 20, 2015

(87) PCT Pub. No.: WO2014/044989
PCT Pub. Date: Mar. 27, 2014

(65) Prior Publication Data
US 2015/0270999 A1 Sep. 24, 2015

(30) Foreign Application Priority Data
Sep. 20, 2012 (FR) ...................................... 1258850

(51) Int. Cl.
*H04L 27/26* (2006.01)
*H04J 3/06* (2006.01)

(52) U.S. Cl.
CPC ......... *H04L 27/2613* (2013.01); *H04J 3/0608* (2013.01); *H04L 27/2656* (2013.01); *H04L 27/2671* (2013.01); *H04L 27/2675* (2013.01)

(58) Field of Classification Search
CPC .................................................. H04L 27/2613
See application file for complete search history.

(56) References Cited

U.S. PATENT DOCUMENTS

| | | | |
|---|---|---|---|
| 2003/0072256 A1* | 4/2003 | Kim | H04L 27/2613 370/208 |
| 2006/0274843 A1* | 12/2006 | Koo | H04J 13/14 375/260 |
| 2010/0061493 A1* | 3/2010 | Takahashi | H04L 7/042 375/343 |

OTHER PUBLICATIONS

International Search Report and Written Opinion dated Jan. 21, 2014 for corresponding International Application PCT/FR2013/052197, filed Sep. 20, 2013.
English Translation of Written Opinion dated Mar. 20, 2015 for coresponding International Application No. PCT/FR2013/052197 filed Sep. 20, 2013.

(Continued)

*Primary Examiner* — John Blanton
(74) *Attorney, Agent, or Firm* — David D. Brush; Westman, Champlin & Koehler, P.A.

(57) ABSTRACT

A method is provided for synchronizing a receiver receiving a signal corresponding to successive samples arranged in a frame with the beginning of the frame being defined by a preamble having a repetition of a first sequence of L samples coming from a transmitter. A method of transmitting the signal is also provided. The preamble is made up of two portions, one portion constituted by the first repeated sequence and another portion constituted by a second repeated sequence. The second sequence corresponds to the symmetrical version of the first sequence limited to a number M of samples that is less than the number L of samples.

15 Claims, 4 Drawing Sheets

(56) References Cited

OTHER PUBLICATIONS

Chao Chen et al. "Three Timing Synchronization Methods Based on Two Same Preambles for OFDM Systems", Procedia Engineering, vol. 29, Jan. 1, 2011, pp. 1656-1661, XP028457393, ISSN: 1877-7058.

French Search Report and Written Opinion dated May 28, 2013 for corresponding French Application No. 1258850, filed Sep. 20, 2012.

* cited by examiner

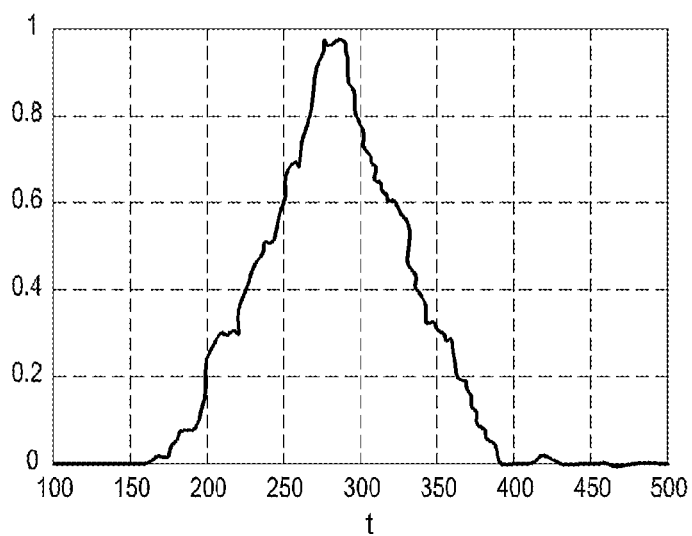
Fig. 1
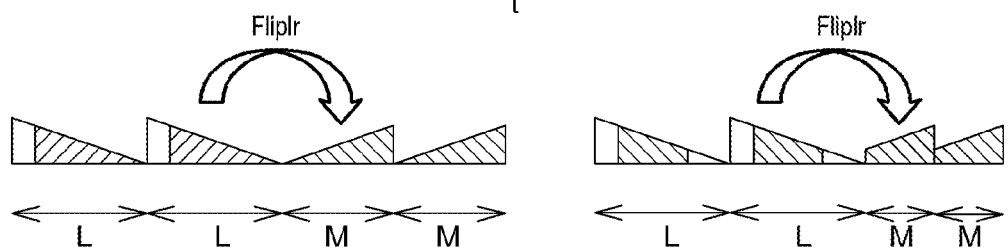
Fig. 2a         Fig. 2b
     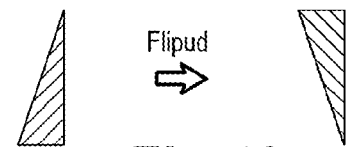
Fig. 3a         Fig. 3b
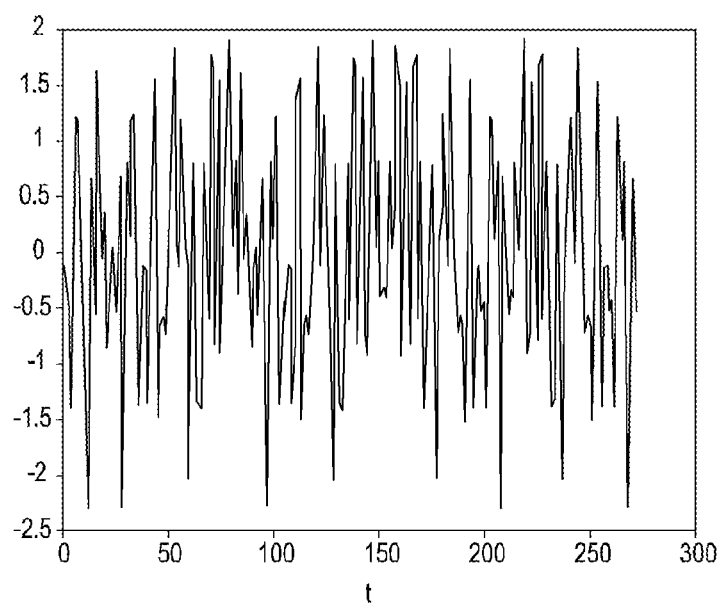
Fig. 4

FRAME SYNCHRONIZATION IN A RECEIVER USING A PREAMBLE HAVING A SPECIFIC STRUCTURE

CROSS-REFERENCE TO RELATED APPLICATIONS

This Application is a Section 371 National Stage Application of International Application No. PCT/FR2013/052197, filed Sep. 20, 2013, the content of which is incorporated herein by reference in its entirety, and published as WO 2014/044989 on Mar. 27, 2014, not in English.

FIELD OF THE INVENTION

The field of the invention is that of transmitting digital signals transmitted in a certain format.

The invention finds applications in the field of telecommunications and, particularly but not exclusively, with a transmission channel of the optical fiber type. The channel could equally well be of the power line telecommunication (PLT) type, or of the over-the-air type, sometimes referred to as radio.

A channel of the optical fiber type is dispersive.

A PLT channel gives rise to effects that are similar to those encountered in an over-the-air channel. In particular, a PLT channel, like an over-the-air channel, may lead to multiple paths during transmission.

A particular application concerns transmission for access networks using orthogonal frequency-division multiplexing (OFDM) and direct intensity modulation of the laser, associated with direct detection by photodiode (known as the intensity modulation and direct detection (IMDD)).

For example, when using a multicarrier signal of the OFDM type, data is formatted in the form of OFDM symbols that are inserted in frames. Each OFDM symbol is generally preceded by a guard interval when the transmission channel is dispersive. The frame generally begins with one or more preambles.

OFDM modulation is well known and used in numerous digital communications systems (ADSL, WiFi, etc.) and in digital broadcast systems (DAB, DVB-T, DRM, etc.). With this kind of modulation, there exist various levels of synchronization at a receiver:
- symbol synchronization, which consists in defining in time the digital symbols transmitted by delivering symbol markers;
- clock synchronization (or clock recovery), which consists in adjusting the sampling frequency of the receiver so as to sample the received signal at the best instants;
- frame synchronization, which consists in identifying the data structures used by the transmitter from the received symbols taken together, in order to de-frame the data and enable it to be decoded; and
- frequency synchronization (or carrier recovery), which consists in correcting the high frequency used by the receiver in order to bring the received signal into baseband while eliminating frequency differences with the carrier used by the transmitter.

In this context, the invention may be associated with frame synchronization methods, with time synchronization methods, and with frequency synchronization methods.

PRIOR ART

Frame synchronization is often performed by using preambles that are transmitted at the beginnings of frames. The receiver conventionally calculates the autocorrelation of the received signal and detects the beginning of the frame if the result of the autocorrelation exceeds a determined decision threshold.

Schmidl and Cox [1] have proposed a preamble with a repetitive structure [A A]. A is a time sequence that may be generated by means of an inverse fast Fourier transform (IFFT) of size N/2 of a sequence PN (pseudo random sequence of +1 and −1) with N being the length of the preamble. The sequence PN is selected so that the peak to average power ratio (PAPR) of the preamble is small, thereby reducing the impact of signal peak clipping by the digital-to-analog converter (DAC). On reception, the synchronization metric illustrated by FIG. 1 is calculated by taking the autocorrelation of the received signal. The Schmidl-Cox method is simple but the variance of the time estimator is large, thereby degrading synchronization performance.

SUMMARY OF THE INVENTION

The invention provides a method of synchronizing a receiver receiving a signal comprising successive samples arranged in a frame with the beginning of the frame being defined by a preamble. The synchronization method comprises:
   acting at successive instants d corresponding to respective received samples to calculate a coarse synchronization metric having an expression that makes use of the repetitive structure of the preamble made up of at least two portions, one portion comprising a first repeated sequence of L samples and another portion comprising a second repeated sequence of M samples, the second sequence corresponding to a symmetrical version of the first sequence limited to a number M of samples that is less than the number L of samples, the metric giving a measure of the sum of correlations between two successive pairs of sample sequences received in a moving window of size equal to the size of the preamble; and
   detecting the event of the coarse metric exceeding a determined threshold, which event corresponds to a "coarse" synchronization instant ds.

The invention also provides a signal receiver for receiving a signal comprising successive samples arranged in a frame with the beginning of the frame being defined by a preamble. The receiver comprises:
   calculation means for acting at successive instants d corresponding to respective received samples to calculate a coarse synchronization metric having an expression that makes use of the repetitive structure of the preamble made up of at least two portions, one portion comprising a first repeated sequence of L samples and another portion comprising a second repeated sequence of M samples, the second sequence corresponding to a symmetrical version of the first sequence limited to a number M of samples that is less than the number L of samples, the metric giving a measure of the sum of correlations between two successive pairs of sample sequences received in a moving window of size equal to the size of the preamble; and
   detector means for detecting the event of the coarse metric exceeding a determined threshold, which event corresponds to a "coarse" synchronization instant ds.

The invention also provides a signal transmission method for transmitting a signal comprising successive samples arranged in a frame with the beginning of the frame being defined by a preamble. The transmission method determines the preamble so that it is constituted by at least two portions, one portion comprising the repetition of a first sequence $T_L$ of L samples and another portion comprising a second repeated sequence $U_M$ of M samples such that the second sequence $U_M$ corresponds to a symmetrical version of the first sequence $T_L$ limited to the number M of samples, which number is less than the number L of samples of the first sequence $T_L$.

The invention also provides a signal transmitted between a transmitter and a receiver and comprising successive samples arranged in a frame with the beginning of the frame being defined by a preamble. The signal is such that:

the preamble is constituted by at least two portions, one portion comprising a first repeated sequence $T_L$ of L samples and another portion comprising a second repeated sequence $U_M$ of M samples such that the second sequence $U_M$ corresponds to a symmetrical version of the first sequence $T_L$ limited to the number M of samples, which number is less than the number L of samples of the first sequence $T_L$.

The invention also provides a signal transmitter for transmitting a signal comprising successive samples arranged in a frame with the beginning of the frame being defined by a preamble. The transmitter comprises means for determining the preamble, such that:

the preamble is constituted by at least two portions, one portion comprising the repetition of a first sequence $T_L$ of L samples and another portion comprising a second repeated sequence $U_M$ of M samples such that the second sequence $U_M$ corresponds to a symmetrical version of the first sequence $T_L$ limited to the number M of samples, which number is less than the number L of samples of the first sequence $T_L$.

The invention relies on transmitting samples arranged in a frame defined by a preamble that possesses a structure that is simultaneously repetitive and symmetrical. By making use of these features separately, the synchronization method is improved both in simplicity and in effectiveness. The second sequence of the preamble is equal to the right-left or the up-down symmetrical version of the first sequence respectively for a sequence written in the form of a line vector and for a sequence written in the form of a column vector, and it is limited to a number M of samples.

Thus, by making use of the repetition of a first sequence and the repetition of a second sequence it is possible to define a coarse synchronization metric that is simple. Unlike the prior art techniques, the coarse synchronization metric varies regularly with time and does not present a plateau, i.e. successive instants that produce the same value for the metric. In addition, the metric presents a shape that is less spread out than the shapes of known metrics, thus improving accuracy.

Furthermore, the coarse synchronization metric as defined in this way does not present a secondary peak because of the constraint on having different lengths for the two sequences. The existence of a secondary peak is disadvantageous since such a peak makes it necessary to determine a decision threshold that is higher since otherwise there is a risk of detecting the secondary peak. If the amplitude of the secondary peak is close to the amplitude of the main peak, then coarse synchronization is less reliable.

The preamble is particularly advantageous since the synchronization metric that makes use of its repetitive structure presents a main peak of large amplitude, even when using an optical transmission channel that introduces chromatic dispersion. This amplitude is close to one when the metric is normalized. The preamble can be used equally well for coherent or non-coherent optical transmission and for radio transmission.

In one particular circumstance, the transmitter comprises an OFDM modulator and the preamble is constituted for example by one or more OFDM symbols. The subcarriers of the OFDM symbols may be mapped with the symbols coming from modulation having a plurality of states such as BPSK, QPSK, and xQAM, where x is a power of two, etc.

In a particular implementation, the synchronization method further comprises:

acting at successive instants d over a search zone of size $\Delta$ beginning at the coarse synchronization instant ds to calculate a fine synchronization metric of expression that makes use of the symmetrical structure of the preamble to give a measure of correlation between sample sequences received over a moving window of size equal to that of the preamble, the maximum of the metric or the metric exceeding a determined threshold determining a "fine synchronization" instant df.

In a particular embodiment, the receiver further comprises:

calculation means for acting at successive instants d over a search zone of size $\Delta$ starting at the coarse synchronization instant ds to calculate a fine synchronization metric of expression that makes use of the symmetrical structure of the preamble to give a measure of correlation between sample sequences received over a moving window of size equal to the size of the preamble, the maximum of the metric or the metric exceeding a determined threshold determining a "fine synchronization" instant df of the receiver.

Making use of the symmetry of the structure of the preamble makes it possible to define a "fine" synchronization metric that presents a maximum when the moving window of size equal to the size of the preamble is positioned on the beginning of the preamble. In addition, the expression of this metric based on the symmetry of the structure of the preamble is such that the maximum is pinched, i.e. narrowed.

The narrowing of the maximum as obtained with the second metric compared with the maximum as obtained with the first metric improves accuracy concerning the determination of the synchronization instant. This accuracy can be observed by the small variance in the difference between the detected position and the true position for the beginning of the received frame.

Because of the particular structure of the preamble that possesses a structure that is simultaneously repetitive and symmetrical, fine synchronization and coarse synchronization can both be performed using the same preamble.

The calculation of the fine metric is limited to a search time window of size $\Delta$ that starts at the coarse synchronization instant obtained by the calculation of the first metric, thereby making it possible to limit the number of operations.

In a particular implementation, the synchronization method further comprises:

acting at successive instants d over a search window of size $\Delta$ starting at the coarse synchronization instant ds to calculate the product of the coarse synchronization metric with a fine synchronization metric of expression that makes use of the symmetrical structure of the preamble to give a measure of correlation between sequences of samples received in a moving window of size equal to the size of the preamble, the maximum of the product of the metrics or the product exceeding a threshold determining a "fine synchronization" instant df.

Making use of the symmetry of the structure of the preamble makes it possible to define a "fine" synchronization metric that presents a maximum when the moving window of size equal to the size of the preamble is positioned on the beginning of the preamble. In addition, the expression for this metric based on the symmetry of the structure of the preamble is such that the maximum is pinched.

The action that is taken at successive instants d to calculate the product of the coarse metric with the fine metric is limited to a search time window of size $\Delta$ that starts at the coarse synchronization instant obtained by calculating the first metric.

The product of the two metrics makes it possible to narrow the maximum's base of the measurement of correlation as obtained by the first metric, thereby improving accuracy concerning the determination of the instant of synchronization. This accuracy can be observed by the small variance in the difference between the detected position and the true position for the beginning of the received frame.

Because of the particular structure of the preamble that possesses a structure that is simultaneously repetitive and symmetrical, the fine synchronization and the coarse synchronization can be performed with the same preamble.

In a particular implementation with a preamble $[T_L, T_L, U_M, U_M]$, L>M, the coarse synchronization metric has the following expression:

$$P_{pro1}(d) = \sum_{i=0}^{L-1} R(d+i) \cdot R(d+i+L)^* + \sum_{i=0}^{M-1} R(d+i+2L) \cdot R(d+i+2L+M)^*$$

with R(k) being the received signal in its digital form, and (.)* is a conjugation operator.

In a particular implementation with a preamble $[U_M, U_M, T_L, T_L]$, M<L, the coarse synchronization metric has the following expression:

$$P_{pro1}(d) = \sum_{i=0}^{M-1} R(d+i) \cdot R(d+i+M)^* + \sum_{i=0}^{L-1} R(d+i+2M) \cdot R(d+i+2M+L)^*$$

In a particular implementation, the coarse metric is power normalized.

Power normalizing the metric advantageously makes it possible for the digital calculations to be bounded and the decision thresholds to be bounded in the range zero to one.

In a particular implementation with a preamble $[T_L, T_L, U_M, U_M]$, L>M, the fine synchronization metric has the following expression:

$$P_{pro2}(d) = \sum_{i=0}^{M-1} [R(d+i+L-M) \cdot R(d-i+N-1)^* +$$

$$R(d+i+2L-M) \cdot R(d-i+2L+M-1)^*]$$

or $$P_{pro2}(d) = \sum_{i=0}^{M-1} [R(d+i+L-M) \cdot R(d-i+N-1)^* + R(d+i+2L-M) \cdot R(d-i+2L+M-1)^*]$$

In a particular implementation with a preamble $[U_M, U_M, T_L, T_L]$, M<L, the fine synchronization metric has the following expression:

$$P_{pro2}(d) = \sum_{i=0}^{M-1} [R(d+i) \cdot R(d-i+N-1)^* + R(d+i+M) \cdot R(d-i+2M+L-1)^*]$$

or $$P_{pro2}(d) = \sum_{i=0}^{M-1} [R(d+i) \cdot R(d-i+2M+L-1)^* + R(d+i+M) \cdot R(d-i+N-1)^*]$$

For a signal R(k) that is real, its conjugate is real: $(.)^* = (.)$. Consequently, the expression for each of the metrics may be written without making the conjugate appear.

In a particular implementation, the fine metric is power normalized.

Power normalizing the metric advantageously makes it possible for the numerical calculations to be bounded by putting a ceiling on power variations equal to a maximum of one, and also makes it possible to set a decision threshold in a known range of zero to one.

In a particular implementation, the transmission method is such that the first sequence $T_L$ is obtained by an inverse Fourier transform of size L of a random sequence S made up of elements belonging to a QPSK constellation, the random sequence S being as follows:
[−1+j; −1+j; 1+j; −1−j; −1−j; −1+j; 1+j; −1+j; −1+j; 1−j; −1−j; −1+j; 1+j; −1−j; −1−j; −1−j; 1+j; −1+j; 1−j; −1−j; 1+j; 1−j; −1+j; −1−j; −1−j; 1+j; −1−j; 0; 0; 0; 0], the number M is equal to 60 and $$T_L = \frac{64}{\sqrt{108}} \cdot \{IFFT_{64}\{[0; S; 0; conj(flipud(S))]\}\}^T$$

where conj(.) is the operator that gives the complex conjugate and flipud(.) is the operator that corresponds to the up-down symmetry effect on elements in a column.

Such a preamble is particularly advantageous for an optical transmission system, e.g. of the intensity modulated direct detected (IMDD) type. The portion conj(flipud(S)) provides Hermitian symmetry that makes it possible to generate a real signal. Modulating a laser requires a signal that is real, i.e. a signal that is not complex. Samples at zero at the end of the vector S that correspond to the edge of the spectrum have the effect of advantageously reducing the aliasing effect in the signal, i.e. effects of spectrum overlap. The factor $$\frac{64}{\sqrt{108}}$$

corresponds to normalizing the power of the preamble.

In a particular implementation, the transmission method is such that the first sequence $T_L$ is obtained by an inverse Fourier transform of size L of a random sequence S made up of elements belonging to a QPSK constellation, the random sequence S being as follows:
[0; 1+j; 1+j; −1+j; 0; 1−j; 0; 0; 1+j; 1+j; −1+j; 0; −1−j; −1+j; 0; 0; 0; −1+j; 0; 1+j; −1−j; 0; 0; −1−j; −1+j; 1+j; 1+j; 0; 0; 0; 0; 0; 0; 0; 0; 0; 0; 0; 0; 0; 1−j; 1+j; 0; 0; −1+j; 1−j; −1+j; 1−j; 0; −1+j; 0; 0; 0; 0; 0; 0; 1+j; 0; 0; 1−j; 1+j],
the number M is equal to 60 and $$T_L = \frac{64}{\sqrt{52}} \cdot \{IFFT_{64}\{S\}\}^T$$

Such a preamble is particularly advantageous for a radio transmission system, e.g. for a broadcast system in particular of the DVB-T2 type or for example for a WiFi system.

In one particular circumstance, the inverse Fourier transform (IDFT, IFFT) forms part of an OFDM modulator and the preamble is then constituted by one or more OFDM symbols.

LIST OF FIGURES

Other characteristics and advantages of the invention appear more clearly on reading the following description of particular implementations, given merely as non-limiting illustrations, and from the accompanying drawings, in which:

FIG. 1, mentioned above with reference to the prior art, illustrates values taken by the synchronization metric of the Schmidl and Cox synchronization method;

FIG. 2a is a diagram of the particular structure of a preamble of the invention;

FIG. 2b is a diagram of the generic structure of a preamble of the invention;

FIG. 3a is a diagram showing the fliplr operator that makes it possible to obtain a left-right symmetrical version of a sequence of a preamble of the invention;

FIG. 3b is a diagram showing the flipud operator that makes it possible to obtain an up-down symmetrical version of a sequence of a preamble of the invention;

FIG. 4 is a time plot of an example of a preamble of the invention that is more particularly adapted to an optical transmission system, e.g. of the IMDD type;

DESCRIPTION OF IMPLEMENTATIONS OF THE INVENTION

Figure 5:
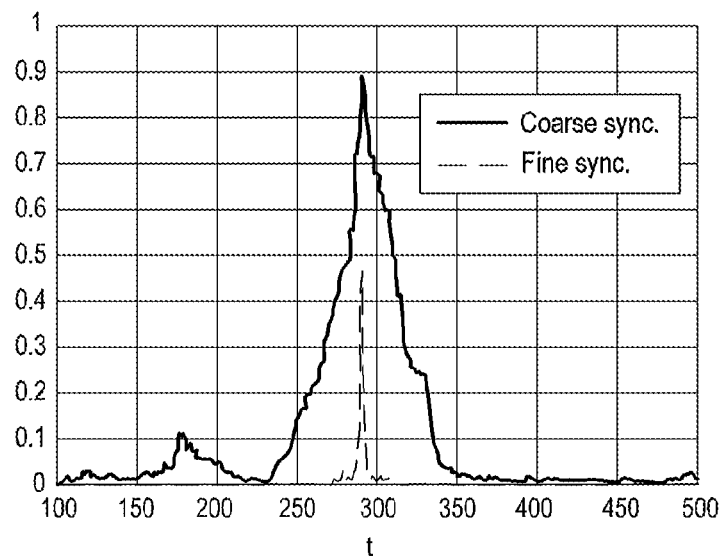
FIG. 5 shows two curves, a first curve corresponding to coarse synchronization using a first metric in accordance with the invention, and a second curve corresponding to fine synchronization that additionally uses a second metric in accordance with the invention.

The general principle of the invention relies on using a preamble of particular structure inserted at the beginning of a frame.

This structure is shown in FIGS. 2a and 2b. The preamble comprises repeating a first sequence of L samples. The preamble also has the repetition of a second sequence of M samples. The second sequence corresponds to a left-right symmetrical version of the first sequence limited to a number M of samples that is less than the number L of samples. This operation that enables the left-right symmetrical version of a sequence is referenced fliplr and is shown in FIG. 3a. Thus, the symmetrical version of a sequence $s_1$, $s_2$, ..., $s_{L-1}$, $s_L$ is the sequence $s_L$, $s_{L-1}$, ..., $s_2$, $s_1$. This operation is performed on the first sequence after being truncated by L-M samples. Truncation may take place at the beginning of the sequence and/or at the end of the sequence. In an alternative, the fliplr operation may be performed on the first sequence, and the resulting sequence is then truncated by L-M samples. When the sequence is written in the form of a column vector, its left-right symmetry becomes up-down symmetry, as shown in FIG. 3b, and the corresponding operation that enables the up-down symmetrical version of a sequence to be obtained is written flipud.

The preamble is written: $[T_L, T_L, U_M, U_M]$ with $U_M$=fliplr $(T)_M$, i.e. $U_M$ is of length M. The length N of the preamble is equal to 2L+2M.

In a mirror form, the form of the preamble is $[U_M\ U_M\ T_L\ T_L]$. The first sequence $U_M$ corresponds to the left-right symmetrical version of the second sequence $T_L$ limited to a number M of samples that is less than the number L of samples. The symmetry operation is performed on the second sequence truncated by L-M samples. The description below is based on the $[T_L\ T_L\ U_M\ U_M]$ form of the preamble. It can be adapted to the mirror form $[U_M\ U_M\ T_L\ T_L]$.

In an implementation, the first sequence $T_L$ is obtained by an inverse fast Fourier transform (IFFT) of size L performed on a random sequence having its elements belonging to a quadrature phase shift keying (QPSK) constellation. The QPSK symbols are advantageously selected so that the peak to average power ratio (PAPR) of the preamble is small.

For example, the following random sequence S:
S=[−1+j; −1+j; 1+j; −1−j; −1−j; −1+j; 1+j; −1+j; −1+j; 1−j; −1−j; −1+j; 1+j; −1−j; −1−j; −1−j; 1+j; −1+j; 1−j; −1−j; 1+j; 1−j; −1+j; −1−j; −1−j; 1+j; −1−j; 0; 0; 0; 0] may be used for generating the sequence $T_L$ from an IFFT having 64 points:

$$T_L = \frac{64}{\sqrt{108}} \cdot \{IFFT_{64}\{[0; S; 0; conj(flipud(S))]\}\}^T$$

where conj(.) is the operator that gives the complex conjugate, in which expression, S is in the form of a column vector, the IFFT applies to a column vector, and the operator $\{\ \}^T$ is the matrix transposition operator. With M=60, the preamble is of length N=2L+2M=2×64+2×60=248. This preamble has a PAPR of about 5.4 decibels (dB). Its appearance in time is shown in FIG. 4.

In an implementation, the QPSK symbols of the sequence are used for transmitting data of particular interest for the receiver, e.g. signaling data and/or frame description data.

In another example that is more particularly adapted to radio transmission, the random sequence S is as follows:
S=[0; 1+j; 1+j; −1+j; 0; 1−j; 0; 0; 1+j; 1+j; −1+j; 0; −1−j; −1+j; 0; 0; 0; −1+j; 0; 1+j; −1−j; 0; 0; −1−j; −1+j; 1+j; 1+j; 0; 0; 0; 0; 0; 0; 0; 0; 0; 0; 0; 0; 0; 1−j; 1+j; 0; 0; −1+j; 1−j; −1+j; 1−j; 0; −1+j; 0; 0; 0; 0; 0; 0; 1+j; 0; 0; 1−j; 1+j].

The sequence $T_L$ is generated from an IFFT of 64 points:

$$T_L = \frac{64}{\sqrt{52}} \cdot \{IFFT_{64}\{S\}\}^T$$

in which expression S is in the form of a column vector. This preamble has a PAPR of about 5.9 dB.

In the context of frequency synchronization, the random structure of the data of the sequence S (QPSK data for the example given) enhances first frequency synchronization that is said to be "coarse".

A transmitter of the invention transmits a signal that corresponds to successive samples arranged in a frame in such a manner that the beginning of the frame is defined by a preamble having the above-described particular structure.

The transmission method of the invention transmits a signal that corresponds to successive samples arranged in a frame in such a manner that the beginning of the frame is defined by a preamble having the above-described particular structure.

A receiver of the invention receiving the frame calculates at least one metric that makes use of the particular structure of the preamble.

In a first implementation of receiver synchronization, the invention makes use of a single metric, and the synchronization is said to be "coarse". This first metric measures the correlation between successive sequences of received samples defined by a moving window. This metric presents a peak when the window is positioned on the preamble since the repeated sequences are strongly correlated. Distortions in the transmitted signal as introduced by the channel or by the receiver itself (noise) can modify the sequences and introduce bias on the correlation between the sequences.

The difference in length between the sequences $T_L$ and $U_M$ ensures that the synchronization metric does not possess a secondary peak.

In a second implementation of receiver synchronization, the invention makes use of two metrics, the above metric and also a second metric that makes it possible to achieve synchronization that is said to be "fine". The second metric measures correlation over a moving window of received samples by considering four successive sequences of samples over the length of the window and by measuring correlation respectively between the first sequence and the symmetrical version of the fourth sequence and between the second sequence and the symmetrical version of the third sequence. This metric has an impulse-like shape located at an instant that corresponds to the instant when the window is positioned on the preamble, since the expression of this second metric makes use of the symmetry of the particular structure of the preamble in order to measure the correlation between the sequences. Distortions in the received signal as introduced by the channel or by the receiver itself (noise) can modify the sequences and can introduce bias in the correlation between the sequences.

FIG. 5 shows two curves, a first curve plotted with a continuous line corresponding to the coarse synchronization that uses the first metric, and a second curve plotted using a dashed line corresponding to the fine synchronization that also uses the second metric. The correlation curves corresponding to the coarse synchronization and to the fine synchronization present a shape that is spread less widely than the shape of the curve obtained using the Schmidl and Cox method as shown in FIG. 1. FIGS. 1 and 5 correspond to a single IMDD optical system with a fiber length of 40 kilometers (km) and an SNR of 15 dB. The narrower spreading of the curves for the metrics obtained by the invention thus provides synchronization results that are better than those obtained when using the Schmidl and Cox method.

The synchronization method in a particular implementation is described in greater detail below.

Figure 6:
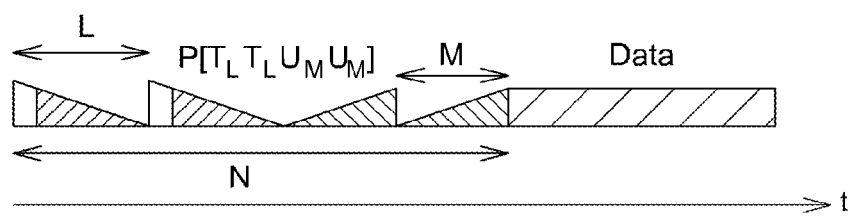
FIG. 6 is a diagram of the transmitted signal of the invention.

R(k) is the received signal as sampled, i.e. after the transimpedance amplifier when using an optical signal. In general, the electrical signal output by the photodiode is amplified by a transimpedance amplifier. An example of the transmitted signal is given in FIG. 6. The transmitted signal is made up of the preamble P=[$T_L$ $T_L$ $U_M$ $U_M$] and of data, Data. The received signal corresponds to the transmitted signal together with possible distortions due to the channel and/or to noise, Noise.

The coarse synchronization metric calculates the sum of the correlations between two successive pairs of sequences, and it has the following expression:

$$P_{pro1}(d) = \sum_{i=0}^{L-1} R(d+i) \cdot R(d+i+L)^* + \sum_{i=0}^{M-1} R(d+i+2L) \cdot R(d+i+2L+M)^* \quad (1)$$

After power normalization, the metric has the following expression:

$$M_{pro1}(d) = \left|\frac{P_{pro1}(d)}{R_{pro1}(d)}\right|^2 \quad (2)$$

with:

$$R_{pro1}(d) = 0.5 \sum_{i=0}^{N-1} |R(d+i)|^2 \quad (3)$$

This first metric gives a measure of the correlation between successive received sample sequences. Without the impact of the channel and of noise, its value is at a maximum when the successive sequences defined by the moving window correspond to the preamble shown in FIG. 2. Its expression is based on the correlation that exists within the preamble firstly between the L samples of the first sequence and the L samples of the repetition of the first sequence, and secondly between the M samples of the second sequence and the M samples of the repetition of the second sequence.

The number of sums Σ in the first metric $P_{pro1}$ is equal to the number of different sequences repeated in the preamble. Each sum may be calculated in iterative manner. That is to say the value of the sum at instant (d+1) may be calculated on the basis of its value at instant (d), thereby reducing the complexity of the synchronization method and of the receiver. Specifically, by taking the example of calculating the first sum, at instant (d+1), its value is given by:

$$\text{Sum}(d+1) = \sum_{i=0}^{L-1} R(d+1+i) \cdot R(d+1+i+L)^*$$

And using the notation i'=i+1, this is written:

$$\sum_{i'=1}^{L} R(d+i') \cdot R(d+i'+L)^*$$

Which is equal to:

$$\sum_{i'=0}^{L-1} R(d+i') \cdot R(d+i'+L)^* + R(d+L)R(d+2L)^* - R(d)R(d+L)^*$$

Which is equal to:

Sum(d)+R(d+L)R(d+2L)*−R(d)R(d+L)*

Thus, instead of performing L-1 additions and L multiplications at each instant d for calculating the first sum of the metric $P_{pro1}(d)$, it is necessary only to perform two additions and two multiplications with an iterative calculation, thereby reducing the complexity of the receiver.

Depending on the implementation, the synchronization method may add to the measurement of correlation between successive sequences of received samples by using a second metric.

The expression for this second metric is as follows:

$$P_{pro2}(d) = \sum_{i=0}^{M-1} [R(d+i+L-M) \cdot R(d-i+N-1)^* + R(d+i+2L-M) \cdot R(d-i+2L+M-1)^*] \quad (4)$$

After power normalization, the expression of the second metric is as follows:

$$M_{pro2}(d) = \left| \frac{P_{pro2}(d)}{R_{pro2}(d)} \right|^2 \quad (5)$$

with:

$$R_{pro2}(d) = 0.5 \left\{ \sum_{i=0}^{M-1} [|R(d+i+L-M)|^2 + |R(d+i+2L-M)|^2] + \sum_{i=0}^{2M-1} |R(d+i+2L)|^2 \right\} \quad (6)$$

This second metric makes use of the left-right (or up-down) symmetrical structure of the preamble that exists over a number M of samples. This second metric is a measure of correlation and its expression is based on the correlation that exists within the preamble of particular structure firstly between the M samples of the first sequence and the M samples of the repetition of the second sequence and secondly between the M samples of the repetition of the first sequence and the M samples of the second sequence. Alternatively, the expression for this second metric may be written as follows:

$$P_{pro2}(d) = \sum_{i=0}^{M-1} [R(d+i+L-M) \cdot R(d-i+2L+M-1)^* + R(d+i+2L-M) \cdot R(d-i+N-1)^*] \quad (7)$$

Expression (7) measures the correlation between the sequences 1 and 3 and between the sequences 2 and 4, while expression (4) measures the correlation between the sequences 1 and 4 and between the sequences 2 and 3, where the four sequences of the preamble are numbered 1 to 4.

For the mirror form of the preamble, expression (1) becomes:

$$P_{pro1}(d) = \sum_{i=0}^{M-1} R(d+i) \cdot R(d+i+M)^* + \sum_{i=0}^{L-1} R(d+i+2M) \cdot R(d+i+2M+L)^*$$

and expression (3) becomes:

$$R_{pro1}(d) = 0.5 \sum_{i=0}^{N-1} |R(d+i)|^2$$

and expression (4) becomes:

$$P_{pro2}(d) = \sum_{i=0}^{M-1} [R(d+i) \cdot R(d-i+N-1)^* + R(d+i+M) \cdot R(d-i+2M+L-1)^*]$$

and expression (6) becomes:

$$R_{pro2}(d) = 0.5 \left\{ \sum_{i=0}^{2M-1} |R(d+i)|^2 + \sum_{i=0}^{M-1} [|R(d+i+M+L)|^2 + |R(d+i+2L+M)|^2] \right\}$$

and expression (7) becomes:

$$P_{pro2}(d) = \sum_{i=0}^{M-1} [R(d+i) \cdot R(d-i+2M+L-1)^* + R(d+i+M) \cdot R(d-i+N-1)^*]$$

The synchronization method of the invention is simple, the calculations to be performed are either operations of addition, or operations of multiplication on a limited number of samples, without manipulation, and without taking likelihood probability into consideration.

Figure 7:
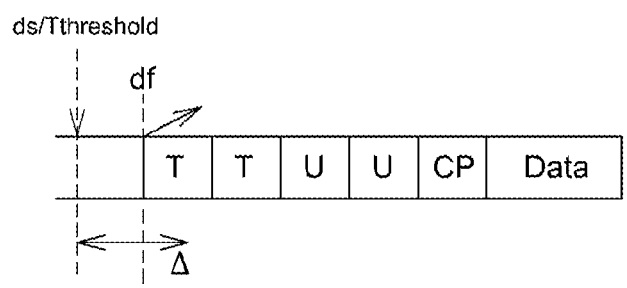
FIG. 7 shows how the synchronization method of the invention progresses in a particular implementation.

The synchronization method of the invention takes place in the manner described with reference to FIG. 7.

The synchronization method calculates the first synchronization metric for the samples received at d successive instants. In a particularly advantageous implementation, the method calculates the metric in its normalized form.

The metric is compared with a determined threshold $T_{threshold}$. The value of this threshold is determined depending on a probability of burst loss. A burst generally corresponds to a frame defined by one or more preambles followed by payload data. For example, with an SNR of 10 dB, the value determined for the threshold is 0.5 for a probability of burst loss of $10^{-5}$ (i.e. losing one burst for every 100,000 bursts sent).

During comparison, the synchronization method detects when the threshold $T_{threshold}$ is exceeded. This corresponds to an instant ds referred to as the "coarse synchronization" instant.

In a particular implementation, the synchronization method refines the previously determined synchronization instant ds by using the second synchronization metric.

Figure 8:
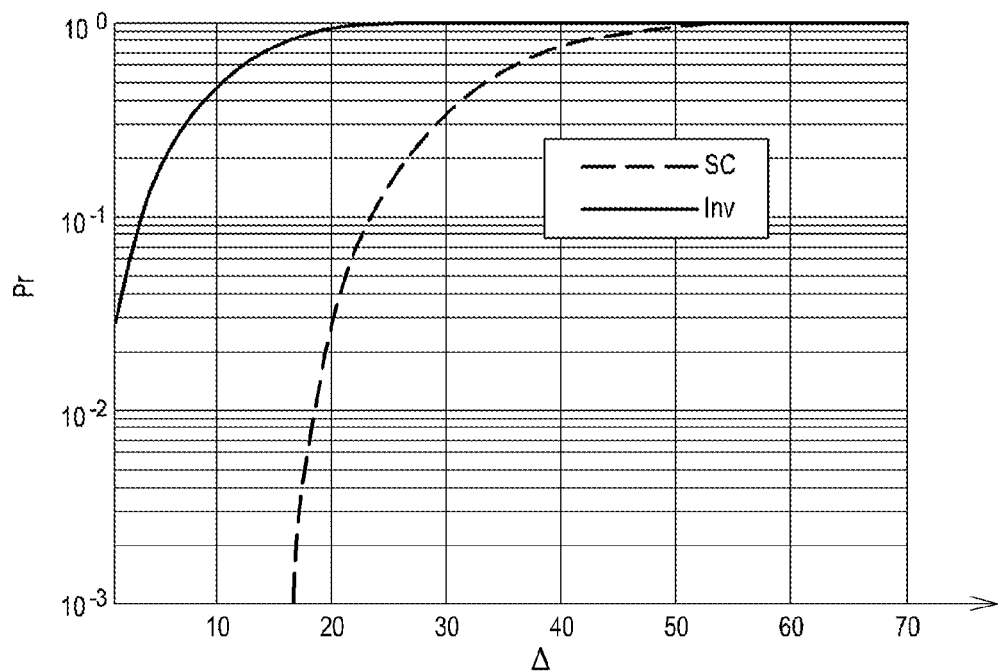
FIG. 8 shows the probability that the true position of the beginning of the frame lies in the search window as a function of the size of the window, the two probability curves shown being obtained respectively with a synchronization method of the invention, curve Inv, and with the Schmidl and Cox method, curve SC.

In this implementation, the synchronization method calculates the second synchronization metric at instants d contained in a search window W of determined size $\Delta$, starting at the instant ds: $W=[ds, \ldots, ds+\Delta-1]$. The method determines the size $\Delta$ of the window W as a function of the probability that the beginning of the frame is to be found in the window. The larger the size $\Delta$ the closer the probability comes to 1, as shown in FIG. 8. The maximum value for the second metric corresponds to the estimated beginning df of the preamble, and thus of the received frame.

In a particular implementation, the synchronization method calculates the product of the first metric with the second metric at instants d contained in the window $W=[ds, \ldots, ds+\Delta-1]$. The maximum value of this product corresponds to the estimated beginning df of the preamble and thus of the received frame.

The product of the two metrics serves to narrow the base of the maximum of the correlation measurement obtained by the first metric, as can be seen clearly in FIG. 5 by comparing the two curves, thereby improving the accuracy with which the synchronization instant is determined. This accuracy is particularly good when the length M is close to the length L. The best results between the various simulations that have been performed occur when the difference in length L-M lies in the range 2% to 3% of the length N. During simulations with a length L of 248 samples, a difference of a few samples between M and L gives rise to sufficient pinching.

Figure 9:
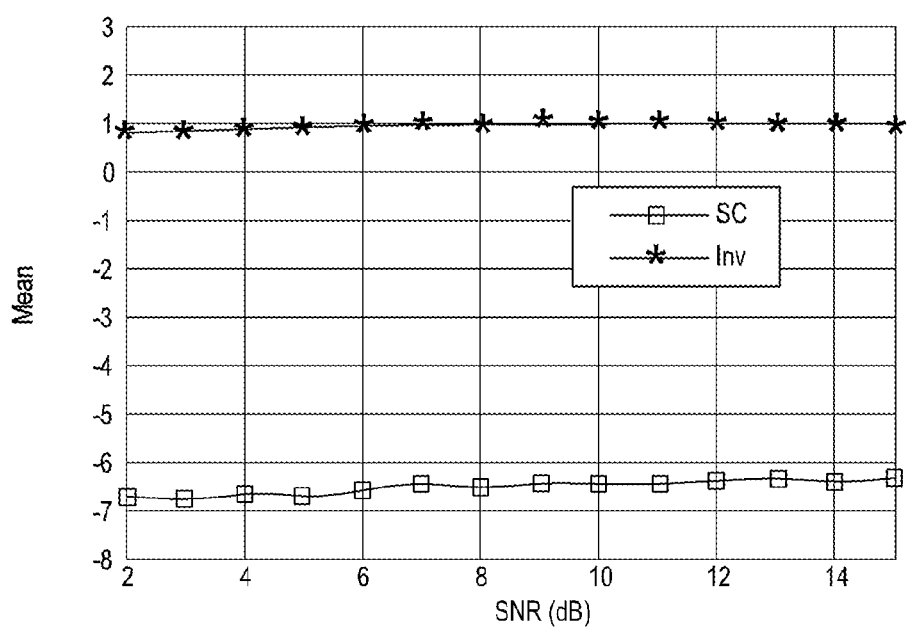
FIG. 9 shows the mean of the difference between the true position at the beginning of the frame and the synchronization position detected as a function of the signal-to-noise ratio (SNR), the two curves shown being obtained respectively using a synchronization method of the invention, curve Inv, and using the Schmidl and Cox method, curve SC.
Figure 10:
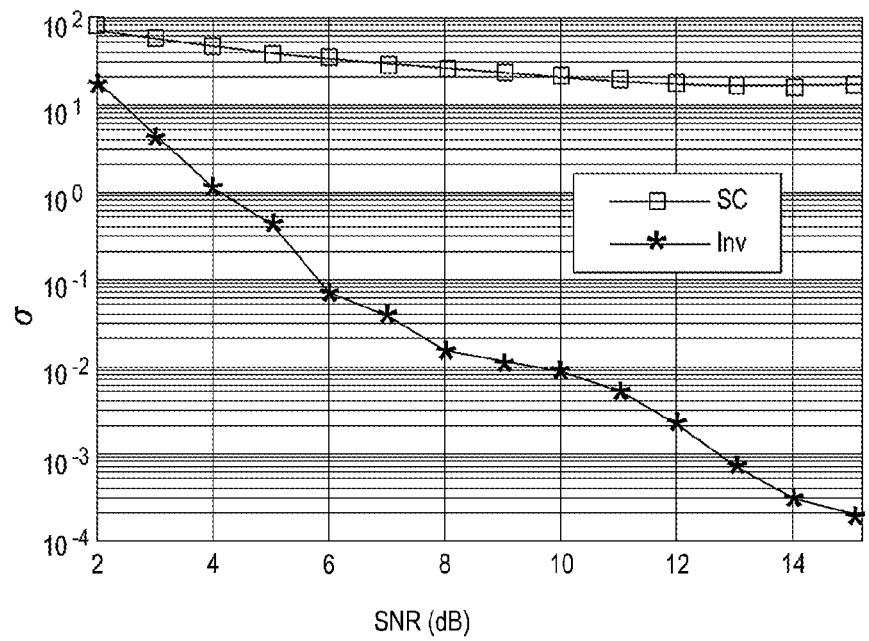
FIG. 10 shows the variance of the difference between the true position at the beginning of the frame and the synchronization position as detected as a function of SNR, the two curves shown being obtained respectively with a synchronization method of the invention, curve Inv, and with the Schmidl and Cox method, curve SC.

This accuracy can be observed by the low variance in the difference between the detected position and the true position of the beginning of the received frame. FIG. 9 shows the mean of the difference between the true synchronization position and the detected position. The curve Inv was obtained using the synchronization method of the invention, and the curve SC was obtained using the Schmidl and Cox method. A comparison of the means of the differences reveals that for the same SNR the difference is smaller with the method of the invention than with the Schmidl and Cox method. A comparison of variances between the Schmidl and Cox method and the method of the invention is shown in FIG. 10. This comparison reveals that the variance is smaller for the synchronization method of the invention for the same SNR. A comparison of the mean of the differences and of the variance reveals that the value detected by the method of the invention is more accurate than that obtained by the Schmidl and Cox method. Curves 9 and 10 also reveal that the method of the invention is robust as a function of SNR. The probability of the method of the invention making a false detection is low, thereby enabling it to be used for burst type transmission, as happens with a WiFi system, and also for transmission that is continuous as happens in a broadcast system.

This implementation is particularly advantageous since the improvement in synchronization is obtained by using the same preamble as is used for coarse synchronization.

Thus, a method of the invention can provide a substantial advantage for a WiFi system. At present, coarse synchronization in such a system is performed with a Schmidl and Cox method. Fine synchronization is then performed, but on the basis of other preambles. The constraint of having two different preambles reduces the spectrum efficiency of transmission. The use of a synchronization method of the invention in a WiFi system makes it possible to improve the spectrum efficiency of transmission by using only one single preamble, both for the coarse synchronization and for the fine synchronization. The same advantage exists in a radio system.

Figure 11A:
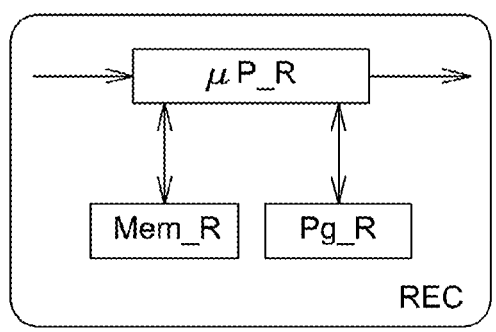
FIG. 11a is a diagram of a simplified structure for a receiver implementing the synchronization method of the invention.

With reference to FIG. 11a, there follows a description of a simplified structure for a receiver using a synchronization method in accordance with the implementations described above.

Such a receiver REC has a memory Mem_R including a buffer memory, a processor unit µP_R, e.g. having a microprocessor under the control of a computer program Pg_R for performing the synchronization method of the invention.

On initialization, code instructions of the computer program Pg_R are loaded by way of example into a random access memory (RAM) prior to being executed by the processor of the processor unit µP_R. The processor unit µP_R receives as input signals that have been transmitted over a channel (e.g. in a single band or in a plurality of bands), which channel may be dispersive (or multipath in an over-the-air channel, for example). The microprocessor of the processor unit µP_R performs the above-described synchronization method in application of the instructions of the computer program Pg_R. To do this, the receiver has calculation means for acting at successive instants d corresponding respectively to the received samples to calculate the coarse synchronization metric and means for detecting when a threshold determined by the coarse metric is exceeded, which event corresponds to an instant ds referred to as the coarse synchronization instant of the receiver. The receiver may also have means for determining a fine search window W on the basis of the coarse synchronization value ds, calculation means for acting at successive instants d contained in the fine search window W to calculate the fine synchronization metric, means for detecting the maximum of the fine metric or for detecting the fine metric exceeding a determined threshold, which maximum or threshold being exceeded corresponds to a fine synchronization instant. These means are controlled by the microprocessor and form part of the processor unit µP_R.

Figure 11B:
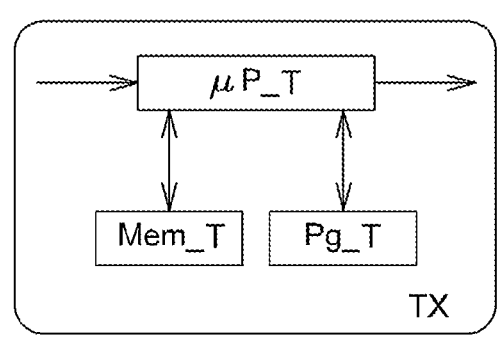
FIG. 11b is a diagram of a simplified structure for a transmitter implementing a transmission method of the invention.

With reference to FIG. 11b, there follows a description of a simplified structure for a transmitter performing a transmission method in accordance with the above-described implementations.

Such a transmitter TX has a memory Mem_T including a buffer memory, a processor unit µP_T, e.g. having a microprocessor and controlled by a computer program Pg_T for performing the method of the invention for transmitting a signal.

On initialization, the code instructions of the computer program Pg_T are loaded by way of example into a RAM prior to being executed by the processor of the processor unit µP_T. The processor unit µP_T receives input data, which may for example be modulated in the form of symbols. The microprocessor of the processor unit µP_T performs the above-described transmission method in application of the instructions of the computer program Pg_T. To do this, the transmitter has means for determining the preamble such that the preamble $P[T_L, T_L, U_M, U_M]$ further includes, after the first repeated sequence $T_L$, a second repeated sequence $U_M$ of M symbols such that this second sequence $U_M$ corresponds to a symmetrical version of the first sequence $T_L$ limited to a number M of symbols that is less than the number L of symbols of the first sequence $T_L$. These means are controlled by the microprocessor and form part of the processor unit µP_T.

[1] T. M. Schmidl and D. C. Cox, "Robust frequency and timing synchronization for OFDM", IEEE Transactions on Communications, Vol. 45, No. 12, pp. 1613-1621, December 1997.

Although the present disclosure has been described with reference to one or more examples, workers skilled in the art will recognize that changes may be made in form and detail without departing from the scope of the disclosure and/or the appended claims.

The invention claimed is:

1. A method comprising:
synchronizing a receiver receiving a signal comprising successive samples arranged in a frame with the beginning of the frame being defined by a preamble, wherein synchronizing comprises:
acting at successive instants d corresponding to respective received samples to calculate a coarse synchronization metric having an expression that makes use of the repetitive structure of the preamble made up of at least two portions, one portion comprising a first repeated sequence of L samples and another portion comprising a second repeated sequence of M samples, the second sequence corresponding to a symmetrical version of the first sequence limited to a number M of samples that is less than the number L of samples, the metric giving a measure of the sum of correlations between two successive pairs of sample sequences received in a moving window of size equal to the size of the preamble; and
detecting an event of the coarse metric exceeding a determined threshold, which event corresponds to a "coarse" synchronization instant ds.

2. The method according to claim 1, wherein the coarse synchronization metric is calculated in iterative manner.

3. The method according to claim 1, wherein the coarse synchronization metric has the following expression:

$$P_{pro1}(d) = \sum_{i=0}^{L-1} R(d+i) \cdot R(d+i+L)^* + \sum_{i=0}^{M-1} R(d+i+2L) \cdot R(d+i+2L+M)^*$$

with R(k) being the received signal in its digital form, and (.)* is a conjugation operator.

4. The method according to claim 1 and further comprising:
acting at successive instants d over a search zone (W) of size Δ beginning at the coarse synchronization instant ds to calculate a fine synchronization metric of expression that makes use of the symmetrical structure of the preamble, the fine synchronization metric measuring correlation between sample sequences received in a moving window of size equal to the size of the preamble, the correlation being measured firstly between M samples of the first sequence and the M samples of the repetition of the second sequence, and secondly between M samples of the repetition of the first sequence and the M samples of the second sequence, the maximum of the metric or the metric exceeding a determined threshold determining a "fine synchronization" instant df.

5. The method according to claim 4, wherein the fine synchronization metric has the following expression:

$$P_{pro2}(d) = \sum_{i=0}^{M-1} [R(d+i+L-M) \cdot R(d-i+N-1)^* + R(d+i+2L-M) \cdot R(d-i+2L+M-1)^*]$$

with N=2L+2M being the length of the preamble, and (.)* being a conjugation operator.

6. The method according to claim 1 and further comprising:
acting at successive instants d over a search zone of size Δ starting at the coarse synchronization instant ds to calculate the product of the coarse synchronization metric with a fine synchronization metric of expression that makes use of the symmetrical structure of the preamble to give a measure of correlation between sequences of samples received in a moving window of size equal to the size of the preamble, the correlation being measured firstly between M samples of the first sequence and the M samples of the repetition of the second sequence, and secondly between M samples of the repetition of the first sequence and the M samples of the second sequence, the maximum of the product of the metrics or the product exceeding a threshold determining a "fine synchronization" instant df.

7. The method according to claim 6, wherein the fine synchronization metric has the following expression:

$$P_{pro2}(d) = \sum_{i=0}^{M-1} [R(d+i+L-M) \cdot R(d-i+N-1)^* + R(d+i+2L-M) \cdot R(d-i+2L+M-1)^*]$$

with N=2L+2M being the length of the preamble, and (.)* being a conjugation operator.

8. A signal receiver for receiving a signal comprising successive samples arranged in a frame with the beginning of the frame being defined by a preamble, the receiver comprising:
calculator configured to act at successive instants d corresponding to respective received samples to calculate a coarse synchronization metric having an expression that makes use of the repetitive structure of the preamble made up of at least two portions, one portion comprising a first repeated sequence of L samples and another portion comprising a second repeated sequence of M samples, the second sequence corresponding to a symmetrical version of the first sequence limited to a number M of samples that is less than the number L of samples, the metric giving a measure of the sum of correlations between two successive pairs of sample sequences received in a moving window of size equal to the size of the preamble; and detector means for detecting an event of the coarse metric exceeding a determined threshold, which event corresponds to a "coarse" synchronization instant ds.

9. The signal receiver according to claim 8, wherein the calculator is adapted to calculate the coarse synchronization metric in iterative manner.

10. The signal receiver according to claim 8, and further comprising:

a calculator configured to act at successive instants d over a search zone (W) of size Δ beginning at the coarse synchronization instant ds to calculate a fine synchronization metric of expression that makes use of the symmetrical structure of the preamble, the fine synchronization metric measuring correlation between sample sequences received in a moving window of size equal to the size of the preamble, the correlation being measured firstly between M samples of the first sequence and the M samples of the repetition of the second sequence, and secondly between M samples of the repetition of the first sequence and the M samples of the second sequence, the maximum of the metric or the metric exceeding a determined threshold determining a "fine synchronization" instant df.

11. A signal transmission method comprising:

transmitting a signal comprising successive samples arranged in a frame with the beginning of the frame being defined by a preamble P, wherein transmitting comprises:

determining the preamble P([$T_L$, $T_L$, $U_M$, $U_M$], [$U_M$ $U_M$ $T_L$ $T_L$]), so that it is constituted by at least two portions, one portion comprising the repetition of a first sequence $T_L$ of L samples and another portion comprising a second repeated sequence $U_M$ of M samples such that the second sequence $U_M$ corresponds to a symmetrical version of the first sequence $T_L$ limited to the number M of samples that is less than the number L of samples of the first sequence $T_L$.

12. The signal transmission method according to claim 11, wherein the first sequence $T_L$ is obtained by an inverse Fourier transform of size L of a random sequence S made up of elements belonging to a QPSK constellation, the random sequence S being as follows:

[−1+j; −1+j; 1+j; −1−j; −1−j; −1+j; 1+j; −1+j; −1+j; 1−j; −1−j; −1+j; 1+j; −1−j; −1−j; −1−j; 1+j; −1+j; 1−j; −1−j; 1+j; 1−j; −1+j; −1−j; −1−j; 1+j; −1−j; 0; 0; 0; 0], the number M is equal to 60 and $$T_L = \frac{64}{\sqrt{108}} \cdot \{IFFT_{64}\{[0; S; 0; conj(flipud(S))]\}\}^T$$

where conj(.) is the operator that gives the complex conjugate and flipud(.) is the operator that corresponds to the up-down symmetry effect on elements in a column.

13. The signal transmission method according to claim 11, wherein the first sequence $T_L$ is obtained by an inverse Fourier transform of size L of a random sequence S made up of elements belonging to a QPSK constellation, the random sequence S being as follows:

[0; 1+j; 1+j; −1+j; 0; 1−j; 0; 0; 1+j; 1+j; −1+j; 0; −1−j; −1+j; 0; 0; 0; −1+j; 0; 1+j; −1−j; 0; 0; −1−j; −1+j; 1+j; 1+j; 0; 0; 0; 0; 0; 0; 0; 0; 0; 0; 0; 0; 0; 0; 1−j; 1+j; 0; 0; −1+j; 1−j; −1+j; 1−j; 0; −1+j; 0; 0; 0; 0; 0; 0; 1+j; 0; 0; 1−j; 1+j],
the number M is equal to 60 and $$T_L = \frac{64}{\sqrt{52}} \cdot \{IFFT_{64}\{S\}\}^T.$$

14. A signal transmitter for transmitting a signal comprising successive samples arranged in a frame with the beginning of the frame being defined by a preamble P, the transmitter comprising:

means for determining the preamble such that:
the preamble P([$T_L$, $T_L$, $U_M$, $U_M$], [$U_M$ $U_M$ $T_L$ $T_L$]) is constituted by at least two portions, one portion comprising the repetition of a first sequence $T_L$ of L samples and another portion comprising a second repeated sequence $U_M$ of M samples such that the second sequence $U_M$ corresponds to a symmetrical version of the first sequence $T_L$ limited to the number M of samples less than the number L of samples of the first sequence $T_L$.

15. A signal receiver for receiving a signal comprising successive samples arranged in a frame with the beginning of the frame being defined by a preamble P, the receiver comprising:

means for detecting the preamble such that:
the preamble P([$T_L$, $T_L$, $U_M$, $U_M$], [$U_M$ $U_M$ $T_L$ $T_L$]) is constituted by at least two portions, one portion comprising the repetition of a first sequence $T_L$ of L samples and another portion comprising a second repeated sequence $U_M$ of M samples such that the second sequence $U_M$ corresponds to a symmetrical version of the first sequence $T_L$ limited to the number M of samples less than the number L of samples of the first sequence $T_L$.

* * * * *